United States Patent [19]

Stultz et al.

[11] Patent Number: 5,457,919
[45] Date of Patent: Oct. 17, 1995

[54] SLUDGE CLARIFIER BOTTOM

[75] Inventors: Jeffrey H. Stultz, Freeport; Hershel R. Rabren, Brazoria, both of Tex.

[73] Assignee: The Dow Chemical Company, Midland, Mich.

[21] Appl. No.: 55,161

[22] Filed: Apr. 29, 1993

[51] Int. Cl.⁶ .................................................. E04H 7/22
[52] U.S. Cl. .................... 52/169.14; 52/192; 52/264; 52/514
[58] Field of Search .......................... 52/169.14, 169.7, 52/169.6, 249, 264, 265, 267, 268, 514, 515, 408

[56] References Cited

U.S. PATENT DOCUMENTS

| | | | |
|---|---|---|---|
| 3,450,295 | 6/1969 | Weber, Jr. | 52/169.14 X |
| 4,069,642 | 1/1978 | Hendriks | 52/249 X |
| 4,117,947 | 10/1978 | Androulakis | 52/249 X |
| 4,221,303 | 9/1980 | Yoshimura et al. | 52/265 X |
| 4,729,198 | 3/1988 | Nethery | 52/169.14 |

*Primary Examiner*—Lanna Mai

[57] ABSTRACT

A sludge clarifier vessel bottom is disclosed which, in one embodiment, includes a bottom wall of the vessel and a portion of a steel side wall of the vessel, the walls intersecting at a corner, the bottom including the walls and a primer coat thereon, an amount of putty in the corner a resin base coat on the primer coat, fiberglass cloth on the resin base coat and a top resin coat on the fiberglass cloth. In one aspect crack controlling apparatus according to this invention is disposed beneath the plastic coat and the plastic coat is, preferably, not bonded to the crack controlling apparatus. Also disclosed are clarifiers with such bottoms.

11 Claims, 2 Drawing Sheets

5,457,919

SLUDGE CLARIFIER BOTTOM

BACKGROUND OF THE INVENTION

1. Field Of The Invention

This invention is related to clarifiers, and, in one aspect to a leak-inhibiting or leak-free bottom structure for a clarifier vessel.

2. Description of Related Art

Clarifiers are used to separate suspended solids from a liquid in which they are suspended. A typical clarifier has a vessel for holding the liquid and some type skimmer or rake which facilitates movement of the solids upwardly so that a clear liquid remains. A wide variety of liquids are clarified including many liquids that contain chemical substances which damage or destroy walls of the clarifier vessel. For example, a clarifier vessel with walls made of steel reinforced concrete can be attacked by chemicals such as sulfates, chlorides, or alkalis in a typical waste water stream or mixed sludge liquor.

Primary sludge clarifiers are typically used to separate out from wastewater suspended particulate matter (such as sand, rust and tar) or floating matter (such as grease, oil or styrofoam). Secondary sludge clarifiers are typically used to separate out waste activated sludge from a mixed liquor containing biological bodies and water. Certain prior art clarifier vessels have a steel sidewall with a portion of the sidewall embedded in concrete.

There has long been a need for an effective and efficient clarifier sidewall and bottom wall for use in sludge clarifiers. There has long been a need for such a wall (lateral and/or bottom) which is impervious to attack by chemicals in liquids or liquors contained in a clarifier vessel. There has long been a need for an effective method of joining a clarifier vessel side wall to a clarifier vessel bottom wall.

SUMMARY OF THE PRESENT INVENTION

The present invention, in one aspect, discloses a clarifier and a clarifier bottom that includes a bottom wall of a clarifier vessel and a portion of a side wall or walls of the vessel. The clarifier bottom in one aspect, includes a side wall member such as a typical steel or reinforced concrete wall; a bottom wall of steel, concrete, or preferably of reinforced concrete; a primer coat, e.g. a catalyzed resin applied to the wall surface; an amount of putty applied at an angled corner where the two surfaces of the bottom wall and the side wall meet at an angle; a base coat of catalyzed resin applied on the primer; a layer of synthetic cloth such as fiberglass reinforced plastic cloth applied on the base coat; and a topcoat of catalyzed resin. In one embodiment the topcoat may be comprised of a plurality of separate resin coats.

In one preferred embodiment of the present invention a clarifier has a clarifier bottom which includes a bottom surface of a clarifier vessel and a side wall of the vessel up to a height of about eighteen inches. In one aspect, prior to the application of the initial primer, putty or other releasing agent is placed in any cracks or crevices in the bottom wall. It is preferred that the putty corner radius be sufficiently large to relieve or prevent excessive stresses in later applied layers of resin and/or cloth. The putty allows differential movement of a vessel side-wall/bottom-wall intersection without leakage. In one aspect a clarifier vessel according to this invention has a steel side wall and a steel-reinforced concrete bottom wall.

It is within the scope of this invention to use available conventional fiberglass and/or resin systems which resist specific chemicals which may be present in a clarifier vessel. In particular embodiments, clarifiers according to this invention are useful for clarifying wastewater (including the clarification of primary and secondary sludges).

In certain embodiments a clarifier bottom according to this invention has crack controlling apparatus beneath a plastic coat on a clarifier vessel bottom concrete wall. In one aspect this apparatus includes a plurality of spaced apart crack controlling anchors, each having a portion extending into the concrete bottom wall and a portion protruding above the concrete bottom wall. In one aspect the portion protruding above the concrete bottom wall is sufficiently large that it permits an overlying plastic coat sufficient freedom of movement to accommodate stress applied to the plastic coat so that the plastic coat does not tear. It is preferred that the plastic coat be made of material that will not bond to the material of the anchors; e.g. anchors made of high density polyethylene and a plastic coat of resin cured fiberglass reinforced plastic. Such crack controlling apparatus may be used in any of its embodiments with any clarifier according to this invention with a concrete or steel-reinforced concrete bottom.

It is, therefore, an object of at least certain preferred embodiments of the present invention to provide:

New, useful, unique, efficient, non-obvious sludge clarifier vessel bottoms which include a bottom wall and a portion of a side wall and to provide clarifier vessels with such a bottom;

Such devices useful with both primary and secondary sludge clarifiers;

Such devices which include a vessel bottom wall and side wall made from steel-reinforced concrete and also useful with steel walled vessels with bottom walls made from steel-reinforced concrete;

Such clarifier bottoms with crack controlling apparatus beneath a plastic coat so that the plastic coat may stretch with respect to the crack controlling apparatus rather than being damaged by a crack in an underlying concrete wall;

Such devices which resist chemical attack by chemicals present in wastewater or liquor with waste activated sludge; and Such devices which accommodate, inhibit or prevent differential wall-bottom movement and inhibit or prevent leakage and corrosion.

This invention, in certain embodiments, resides not in any particular individual feature, but in the combinations of them herein disclosed and claimed and it is distinguished from the prior art in these combinations with their structures and functions. There has thus been outlined, rather broadly, features of the invention in order that the detailed descriptions thereof that follow may be better understood, and in order that the present contributions to the arts may be better appreciated. There are, of course, additional features of the invention that will be described hereinafter and which may form the subject matter of the claims appended hereto. Those skilled in the art will appreciate that the conceptions, upon which this disclosure is based, may be utilized as a basis for the designing of other structures, methods and systems for carrying out the purposes of the present invention. It is important, therefore, that the claims be regarded as including any legally equivalent constructions insofar that they do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

DESCRIPTION OF THE DRAWINGS

So that the manner in which the above-recited features, advantages and objects of the invention, as well as others which will become clear, are attained and can be understood in detail, more particular description of the invention briefly summarized above may be had by references to certain embodiments thereof which are illustrated in the appended drawings, which drawings form a part of this specification. It is to be noted, however, that the appended drawings illustrate certain preferred embodiments of the invention and are therefore not to be considered limiting of its scope, for the invention may admit to other equally effective or equivalent embodiments.

DESCRIPTION OF EMBODIMENTS PREFERRED AT THE TIME OF FILING FOR THIS PATENT

Figure 1:
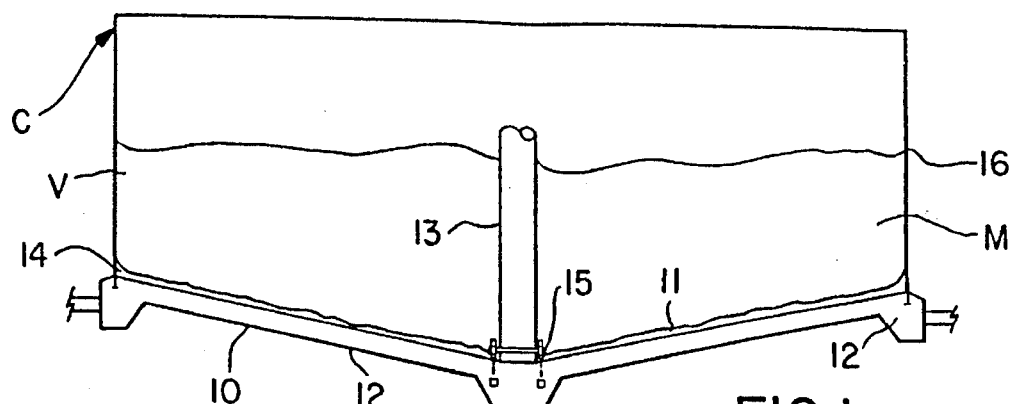
FIG. 1 is aside cross-sectional view of a clarifier and a clarifier bottom according to the present invention.

Referring now to FIG. 1, a primary clarifier C according to one preferred embodiment of the present invention has a clarifier vessel V with a bottom 10 and a steel sidewall 16. A liquid mixture M partially fills the vessel V. A cathodically-protected center column 13 is bolted to the concrete bottom 10 with a bolting framework 15. The bottom 10 according to this invention includes the concrete bottom wall 12, a wall portion 14 of the steel sidewall 16, and a fiber reinforced plastic material 11 bonded to the wall 12 and lapped up the wall portion 14. The steel sidewall 14 is embedded in the concrete bottom wall 12. In one embodiment the vessel V is eighty five feet in diameter and the column 13 is two feet in diameter.

Figure 2:
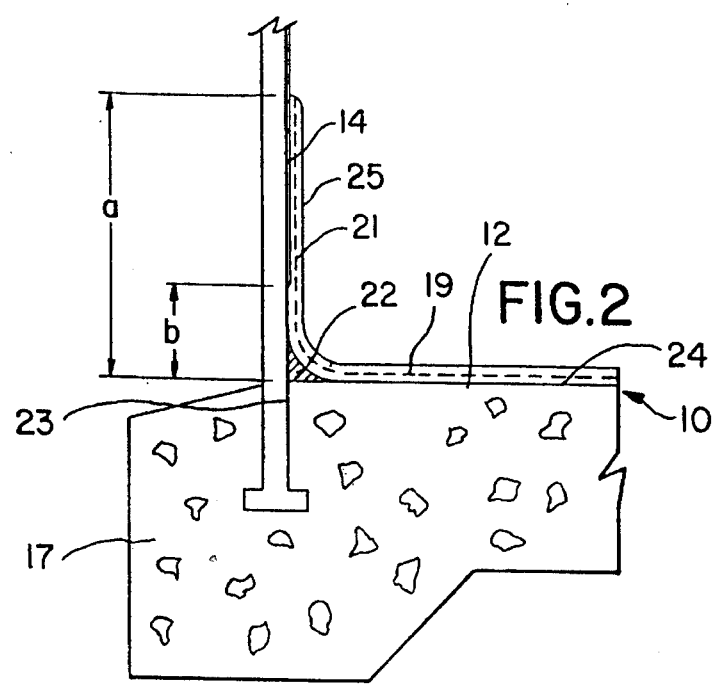
FIG. 2 is a side cross-sectional view of a portion of the clarifier of FIG. 1.

As shown in FIG. 2 a crack-inhibiting corner 23 according to the present invention includes a fiber reinforced plastic layer 19 which covers and is bonded to the bottom wall 12 and has a portion 21 which is lapped up on the side wall 14.

An amount of putty 22 is applied in a corner 23, thus forming a crack-inhibiting, or, most preferably, a crack-resistant juncture of the steel side wall and the concrete bottom wall. In one embodiment it is preferred that an initial cured epoxy coating 24 extend about six inches up the side wall portion 14 ("b" in Fib. 2) and that this coating be between about 25 and about 40 mils thick. Preferably the six-inch band b is cleaned down to bare metal, e.g. it is abrasive blasted to white metal, prior to application of the epoxy (for adhesion). In this embodiment it is preferred that the putty 22 form a radius of about two inches from the intersection of the side and bottom wall. Fiberglass scrim cloth 25 (e.g. about one-eighth inch thick) is applied to the bottom and side walls. The bottom wall 12 is preferably made of steel-reinforced concrete.

Figure 3:
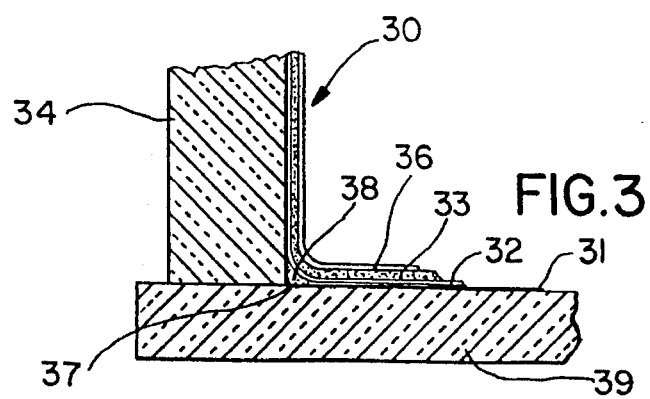
FIG. 3 is a side cross-sectional view of a clarifier bottom according to the present invention.

A clarifier bottom 30 according to this invention (FIG. 3) is similar to the bottom 10 previously described, but a vessel side wall 34 is also made of steel reinforced concrete as is a bottom wall 39. A primer coat 31 is applied to the bottom wall 39 and to the side wall portion 34. Then an amount of putty 38 is applied in a corner 37 where the walls meet. A resin base coat 32 is applied on the primer coat and fiberglass cloth 33 is applied on the resin base coat. Then a resin topcoat 36 is applied on the fiberglass cloth 33.

In one particular embodiment of the bottom 30 the side wall portion is about eighteen inches in height ("a" in FIG. 2); the clarifier C is useful as a primary waste water clarifier: and components of the bottom 30 employ conventional commercially available material as follows:

| | MATERIAL | THICKNESS |
|---|---|---|
| PRIMER 31 | SEMSTONE 110 P/S RESIN | 2 COATS, 8 TO 10 MILS @ |
| PUTTY 38 | SEMSTONE 140 PUTTY OR SEMSTONE 8084 PUTTY | 2 INCH RADIUS |
| BASE COAT 32 | SEMSTONE 140 RESIN | 50 MILS |
| CLOTH 33 | FIBERGLASS CLOTH | |
| TOP COAT 36 | SEMSTONE 245 RESIN OR SEMSTONE 140S RESIN | 75 MILS |

In an alternate embodiment, the top coat 36 includes a first 50 mil resin application to which, after it cures, is applied a 75 mil resin application.

Figure 4:
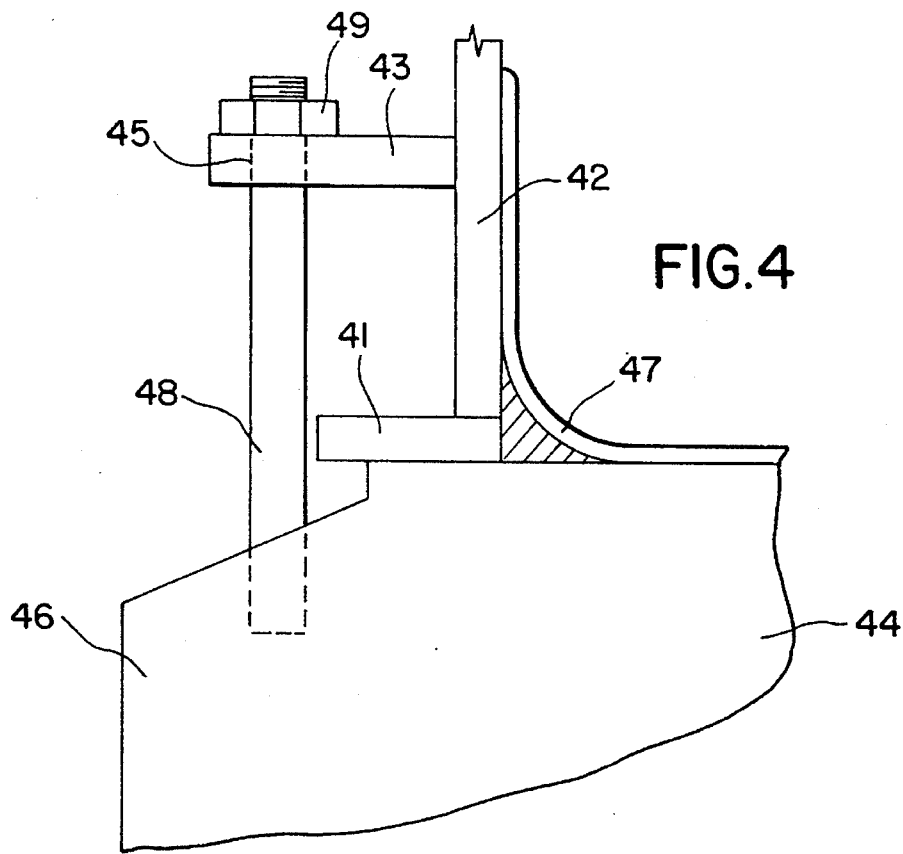
FIG. 4 is a partial side view in cross-section of a clarifier and a clarifier bottom according to the present invention.

FIG. 4 illustrates a clarifier according to the present invention with a steel side wall 42 and a concrete bottom wall 44. The concrete bottom wall 44 has an extension portion 46 to which is secured a plurality of bolts (one shown) 48. Preferably the bolts 48 are partially embedded in the concrete bottom wall to secure them therein. The steel side wall 42 includes a base portion 41 and a flange 43. The steel side wall in this embodiment forms a cylinder open at the top and mounted on the concrete bottom wall. The flange 43 can extend completely around the side wall 42 or separate individual flanges can be provided corresponding to each bolt 48. Each bolt 48 extends through a corresponding hole in the flange 43 and the steel side wall 42 is secured in place on the concrete bottom wall with a nut 49 tightened on each bolt 48. A plastic coat 47 is like the previously described plastic coats.

Figure 5:
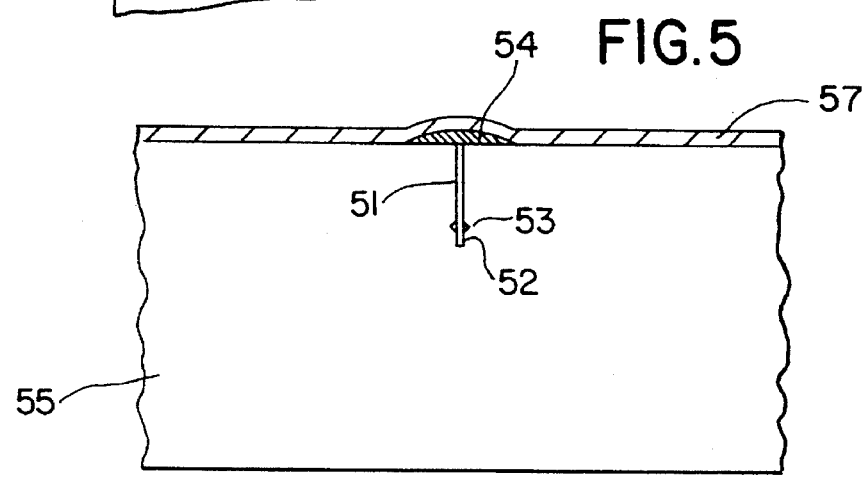
FIG. 5 is a partial side view in cross-section of a clarifier bottom according to the present invention.

A clarifier bottom 50 according to the present invention illustrated in FIG. 5 may be used with the previously described clarifiers or clarifier bottoms made of concrete, steel-reinforced concrete, or any material subject to cracking. One or more crack controlling anchors 51 have a downwardly extending portion 52 which is disposed in a concrete bottom wall 55; with an outwardly extending rib 53; and with a cap portion 54 (which is shown as a coned strip, but may be any appropriate shape or size) that protrudes above the concrete bottom wall 55 and is disposed beneath a plastic coat 57 (like the plastic coat 47). The crack controlling anchors 51 serve to focus stress at the anchor so that cracks tend to form there and so that cracks are inhibited from propagating elsewhere. Also, in preferred embodiments in which the plastic coat is not attached to or bonded to the cap 54, cracks forcing apart portions of the concrete bottom wall 55 do not result in tearing of the plastic cloth, since the plastic coat above the anchor may move and stretch with respect to the anchor without damage or tearing.

In one embodiment the anchor is a strip about two inches wide and three inches high. The strip is either poured in place from hardenable or curable material or an already-formed strip is emplaced in a pre-formed recess. In one embodiment the anchors are made from high density polyethylene which does not bond to a fiberglass reinforced plastic coat. Any of the plastic coats described herein will provide tensile strength at a surface of a bottom wall, providing further crack resistance, including resistance to surface cracks associated with concrete uplift.

Figure 6:
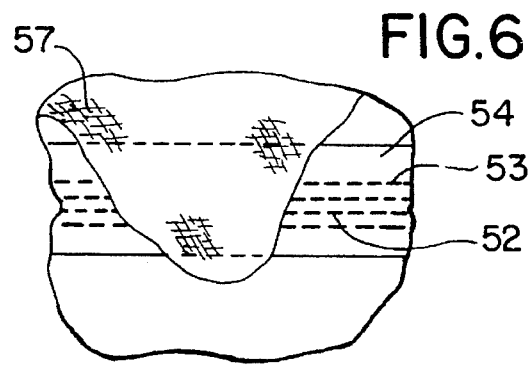
FIG. 6 is a top view of part of the bottom shown in FIG. 5.

As shown in FIG. 6, the plastic coat 57 is partially removed to expose the cap 54 of the anchor strip. The outer two dotted lines indicate the rib 53 and the inner two dotted lines indicate the downwardly extending portion 52. Although it is preferred that an anchor strip according to this invention extend continuously across an area in which crack control is desired, it is within the scope of this invention to provide discrete pieces of the strip or separate crack controlling anchors (e.g. with a circular cap, a circular downwardly extending portion, and a circular outwardly extending rib or ribs) and to use one or a plurality of these anchors spaced apart on an area in which crack control is desired.

Filed on even date herewith are the following applications, co-owned with this application, whose subject matter is hereby disclosed herein and which may be employed with the present invention in a material treatment system (invention titles followed by applicant(s) name):

"Sludge Digestion;" U.S. Ser. No. 08/055,159; J. Stultz, D. Bice;

"Sludge Ammonia Removal;" U.S. Ser. No. 08/055,158; J. Stultz, D. Bice;

"Sludge Deodorization;" U.S. Ser. No. 08/055,157; J. Stultz, D. Bice;

"Tank Foundation;" U.S. Ser. No. 08/055,152; J. Stultz;

"Pipe To Concrete Transition;" U.S. Ser. No. 08/055,153; J. Stultz;

"Slab Joint Liquid Stop;" U.S. Ser. No. 08/055,156; J. Stultz;

"Sludge Clarifier Roof;" U.S. Ser. No. 08/055,154; J. Stultz;

"Hopper Liner;" U.S. Ser. No. 08/055,155; J. Stultz;

"Waste Gas Incineration;" U.S. Ser. No. 08/055,160; J. Stultz, D. Bice

In conclusion, therefore, it is seen that the present invention and the embodiments disclosed herein and those covered by the appended claims are well adapted to carry out the objectives and obtain the ends set forth. Certain changes can be made in the described and in the claimed subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A clarifier vessel bottom for a clarifier vessel for containing liquid, the clarifier vessel bottom comprising a concrete bottom wall, a steel side wall having a portion secured to the concrete bottom wall, an amount of crack-inhibiting putty in an interior corner formed between the bottom wall and the side wall, and a plastic coat inside the vessel covering the bottom wall, the crack-inhibiting putty, and part of the side wall.

2. The vessel bottom of claim 1 further comprising crack controlling anchor means secured to the concrete bottom wall beneath the plastic coat, the plastic coat covering the anchor means and in contact therewith.

3. The vessel bottom of claim 2 further comprising the crack controlling anchor means comprising a plurality of spaced apart anchors each with a first portion disposed above the concrete bottom wall and beneath the plastic coat and each with a second portion extending into the concrete bottom wall.

4. The vessel bottom of claim 2 wherein the plastic coat is movable with respect to the crack controlling anchor means.

5. The vessel bottom of claim 1 wherein the plastic coat is a fiberglass reinforced plastic coat and the anchors are made of high density polyethylene.

6. The vessel bottom of claim 1 wherein the plastic coat comprises a resin primer coat, a resin base coat on the resin primer coat, a covering of fiberglass reinforced plastic cloth on the resin base coat, and a top resin coat on the cloth.

7. The vessel bottom of claim 6 wherein the resin primer coat is two separately applied resin coats.

8. The vessel bottom of claim 7 wherein each of the two separately applied coats is between 8 and 10 mils thick.

9. The vessel bottom of claim 7 wherein the top resin coat comprises two separately applied coats, a first one 50 mils thick and a second one 75 mils thick.

10. The vesssel bottom of claim 7 wherein the resin base coat is 50 mils thick, the fiberglass reinforced plastic is about one-eighth inch thick, and the resin top coat is 75 mils thick.

11. A wastewater clarifier vessel bottom comprising a concrete bottom wall, a portion of a steel side wall having a portion secured to the concrete bottom wall, an amount of crack-inhibiting putty in an interior corner formed between the bottom wall and the side wall, a plastic coat inside the vessel covering the bottom wall, the crack-inhibiting putty, and part of the side wall, a plurality of spaced apart crack controlling anchors each with a first portion disposed above the concrete bottom wall and with a second portion extending into the concrete bottom wall, and the plastic coat movably covering the anchors and in contact therewith.

\* \* \* \* \*